Feb. 19, 1957 J. G. SUTHARD 2,782,151
METHOD OF TESTING OILS
Filed Sept. 20, 1951
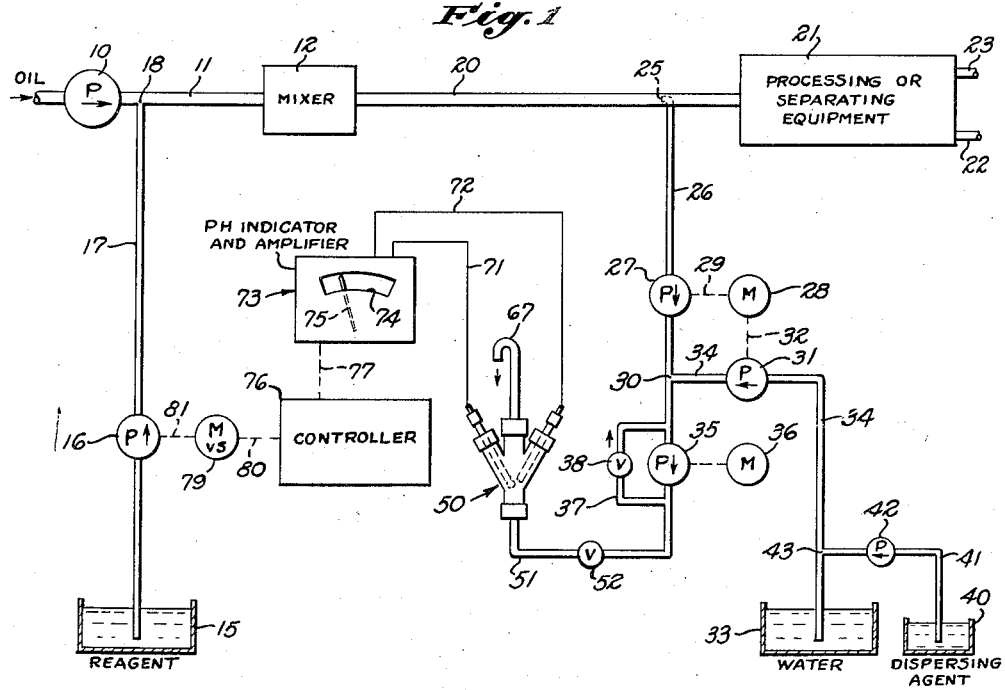
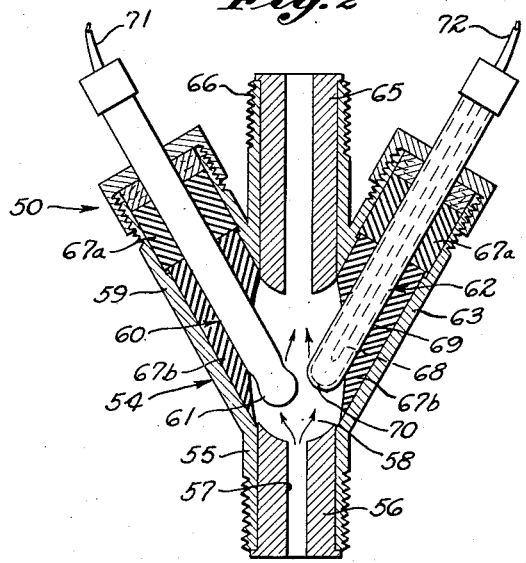
INVENTOR:
JAMES G. SUTHARD
BY HIS ATTORNEYS
HARRIS, KIECH, FOSTER & HARRIS

2,782,151

METHOD OF TESTING OILS

James G. Suthard, Long Beach, Calif., assignor to Petrolite Corporation, Wilmington, Del., a corporation of Delaware Application September 20, 1951, Serial No. 247,537

9 Claims. (Cl. 204—1)

My invention relates to the electrometric testing of oils; to the control of reagents added to an oil; and to a novel method and apparatus for measuring the pH of an oil system or for establishing a potential which varies with changes in alkalinity or acidity of an oil system and which can be used for indication or control purposes.

It is common to measure the pH of an aqueous system by immersing therein a glass electrode and a reference electrode, the potential developed therebetween being amplified to operate a meter calibrated in pH units. The potential developed between the electrodes depends on the relative concentrations of hydrogen and hydroxyl ions in the aqueous solution. It is conventional to consider the acidity or alkalinity of such a solution in terms of its hydrogen ion concentration, the pH value being defined as the logarithm of the reciprocal of the hydrogen ion concentration.

Measurement of pH of oil systems is not this simple, and most such systems will give no usable potential if made to bridge the electrodes of an electrometric cell. It is possible to obtain pH readings, although shifted from those observed when testing aqueous systems, by mixing with the oil an alcoholic solvent containing a small amount of water, as disclosed and claimed in my copending application Serial No. 677,381, now Patent No. 2,607,718. Such a method is costly because of the alcoholic diluent consumed and is inferior to the present invention in other respects.

It is an object of the present invention to provide a novel water-phase determination of pH in oils. By the term "oils" as used herein, I have reference to oils from animal, vegetable or mineral sources and to distillates, cracked products or residuums obtained in the refining of oils from such sources. The invention will be exemplified as applied to the problem of measuring the pH of a stream of a petroleum product after mixing with a reagent reactable with some component of such product.

In the present invention I mix with a sample of the oil to be tested a sufficient amount of water to form an oil-in-water dispersion and bridge the electrodes of an electrometric cell with this dispersion. It is an object of the invention to operate in this manner and to prevent any substantial separation of the oil and water while in the cell and thus substantially prevent contamination of the electrodes by adherence thereto of a film or droplets of oil.

To aid in accomplishing this, it is an object of the invention to maintain the dispersion in a state of turbulence while in the electrometric cell. The preferred method of accomplishing this is to pass a stream of the water-continuous dispersion relatively rapidly through a relatively small electrometric cell, thereby maintaining a degree of turbulence preventing substantial separation of the oil and water and thereby obtaining a desirable laving of the electrodes by the advancing stream. This system offers the additional advantage that it is excellently suited to the testing of a small sample stream of the oil, giving a very quick response to any change in acidity or alkalinity of the main stream.

Additionally, it has usually been found necessary to use a chemical or dispersing agent, otherwise described as a wetting agent of the dispersion-stabilizing type, present at the time the dispersion is formed or at least shortly thereafter, to maintain the oil in dispersed state in the water and so that water wets the electrodes to prevent coating or "poisoning" of the glass electrode or reference electrode of the electrometric cell. In the absence of such a dispersing agent, it will be found that oil contamination or fouling of the electrodes soon occurs when testing many oil systems.

However, if small amounts of such an agent are employed, preferably added to the water before it is mixed with the oil to be tested, it has been found that the electrometric cell will not become contaminated and that it can be used in continuous processes for substantially an unlimited time. Oils not otherwise susceptible to testing in a water-phase system are thereby made susceptible thereto. It has been found also that the electrometric potential developed between the electrodes of such a cell is accurately responsive to changes in the acidity or alkalinity or hydrogen ion concentration of the oil being tested. Furthermore, titration curves plotted from the electrometric potential developed by the cell show inflections corresponding to those determined on the same oil by oil-phase determinations of the type suggested in my copending application supra.

It is an important object of the present invention to operate in accordance with the principles of the preceding paragraph and to have such a dispersing agent present in the water-continuous dispersion bridging the electrodes of an electrochemical cell. Certain dispersing agents are unexpectedly beneficial in the process, as will be later mentioned.

The invention thus far described can be employed in the batch testing of oil samples to determine the pH thereof. In addition, however, the invention is particularly well suited to the continuous testing of an oil stream, often after a reagent has been mixed therewith, to establish an electrometric potential which varies with the hydrogen ion concentration of the oil and which can be used to give an indication of the existing pH of the oil, or to control the amount of reagent added to the oil to maintain the pH of the resulting stream substantially constant, or both. In such reagent-control systems, it is an object of the present invention to process a small sample stream in accordance with the invention and in a manner to form a water-continuous dispersion or emulsion which is flowed continuously through an electrometric cell, the electrical output of this cell being amplified and used in any manner to control the amount of reagent added to the main oil stream. In this connection, it is an object of the invention, in its preferred embodiment, to mix the dispersing agent with the water before the oil is dispersed therein.

Further objects and advantages of the invention will be evident to those skilled in the art from the following description of a purely exemplary embodiment of the invention, shown in the accompanying drawing, in which:

Fig. 1 is a pipe-line diagram illustrating the invention when used for the continuous control of the amount of the reagent added to an oil stream; and Fig. 2 is a vertical sectional view of the electrometric cell shown in Fig. 1.

Referring particularly to Fig. 1, a large stream of oil is pumped by a pump 10 to flow under pressure along a pipe 11 to a mixer 12 of any suitable construction. A stream of a reagent is continuously introduced into and mixed with the large oil stream. As shown, this reagent is drawn from a reagent tank 15 by a pump 16 and discharged through a pipe 17 into the oil stream at a junction 18. Some mixing occurs at this junction but, if necessary, an additional mixing action is imposed in the mixer 12. The reagent is such as to react with the oil or some component thereof. If the reagent is oil-soluble, very little mixing action will be required, but if an aqueous reagent is used, considerable mixing may be required to disperse the reagent in the oil in the form of small droplets offering a large interfacial area of contact with the oil.

The stream issuing from the mixer 12, sometimes hereinafter referred to as the "major stream," flows along a pipe 20 to any suitable processing or separating equipment 21, not per se a part of the present invention and thus not illustrated in detail. This equipment may comprise merely one or more storage tanks or may represent apparatus to which the major stream is delivered for further processing by heat, pressure, chemical means, electrical means, etc. In other instances, this equipment may comprise one or more settling tanks in which an aqueous phase or certain reaction products or both may separate from the oil to be withdrawn through a pipe 22, the separated oil being withdrawn through a pipe 23. As concerns the present invention, it is immaterial whether the oil advancing along the pipe 20 is a single-phase or multiple-phase liquid, and reference to a stream of "oil" is inclusive of both.

In many of such processes it is desirable that the acidity, alkalinity or pH of the oil stream in the pipe 20 be maintained substantially constant. With this object in view, manual control of the amount of reagent becomes very difficult if there is a variation in the volume or character of the oil; a change in the volume, character or concentration of the reagent; a variation in the mixing action; or a variation in temperature of the oil or reagent. In such instances, constancy of the product in the pipe 20 can best be insured by control of the reagent in response to changes in hydrogen ion concentration or pH of the stream. In fact, as suggested in Fig. 1, the invention can be employed to control automatically the amount of the reagent added to the incoming oil to maintain the pH of the major stream in the pipe 20 substantially constant.

To do this, I prefer to use a sampling means of the type disclosed in my application supra or as represented in a simplified way in Fig. 1. As therein shown, the sampling means includes a small nipple or elbow 25 facing upstream within the pipe 20 to withdraw from the major stream a small representative sample stream of the oil which advances along a sample pipe 26. A metering pump 27 is operatively connected to a motor 28 through a connection indicated by dotted lines 29 to deliver a metered quantity of the sample to a junction 30. A pump 31 operatively connected to the motor 28, as suggested by dotted lines 32, pumps a metered amount of water from a tank 33 through a pipe 34 to the junction 30.

The water of this stream mixes with the oil stream at the junction and also in a mixer shown as a pump 35 driven by a motor 36 and by-passed by a pipe 37 having a valve 38 therein. The pump 35 serves as a mixing means for intimately mixing the oil and water to disperse the oil in the water in the form of minute droplets. The pump 35 is preferably of the rotary type, and its mixing action may be augmented by opening the valve 38 so that the oil and water pass repeatedly through the pump. The pumps 27 and 31, on the other hand, are preferably of the positive-displacement type to deliver accurately proportioned streams of oil and water to the junction 30. Being driven by the same motor 28, these pumps 27 and 31 can be made to deliver proportioned amounts of these liquids, and the relative amounts thereof can be adjusted by changing the relative pumping actions, as is well known in the art.

The dispersing agent can be mixed batchwise with the water in the tank 33 or can be continuously proportioned into the stream of water flowing along the pipe 34. As shown, the dispersing agent is drawn from a tank 40 through a pipe 41 and proportioned by a pump 42 to a junction 43 of the pipe 34. The character of this dispersing agent will be later discussed in detail. Suffice it to say, that this chemical agent is usually water-soluble and mixes readily with the water in the pipe 34. It aids in producing a water-continuous dispersion and in stabilizing such dispersion to such extent that substantially no separation of the oil takes place during the subsequent flow to and through the electrometric cell.

This electrometric cell, indicated generally by the numeral 50, comprises a glass or insulated metal housing receiving the dispersion through a pipe 51 containing a pressure-reducing valve 52. Various types of cells may be employed, but it is desirable that the cell be of relatively small volume so that the dispersion flows turbulently therethrough. It is also desirable that the inflowing dispersion lave one or both of the electrodes.

A cell of this type is illustrated in Fig. 2 as providing a Y-shaped housing 54 having an inlet connection 55 joined to the pipe 51 and containing a bushing 56 having a passage 57 which directs the emulsion upwardly in a chamber 58. Extending angularly into this chamber along an arm 59 of the housing 54 is a glass electrode 60 having a bulb of pH-sensitive glass 61 in the path of flow of the dispersion. Similarly, a reference electrode 62 extends along an arm 63 of the housing and terminates in the chamber 58 in the path of flow of the dispersion, this dispersion bridging the space between the electrodes and rising through a bushing 65 in an outlet fitting 66 of the housing, being discharged at atmospheric pressure through a pipe 67 (Fig. 1) to the sewer or to oil-recovery equipment.

The electrodes 60 and 62 may be of conventional form and are respectively sealed in the arms 59 and 63 by gland structures 67a and plugging structures 67b as shown. The reference electrode 62 is most conveniently a calomel electrode of conventional form having an internal calomel-containing tube 68 inside an outer tube 69, the space therebetween being filled with an electrolyte such as a KCl solution of definite concentration. This electrolyte is in ionic communication with the calomel and with the dispersion in the chamber 58. The latter ionic communication is through a so-called liquid junction commonly formed by a porous fiber of asbestos 70 extending between the internal electrolyte and the external dispersion, or by a sleeve contacting the outer tube 69 at a ground-glass junction through which ionic communication is established between the dispersion and the electrolyte. With either type or other types of liquid junction it is desirable that the incoming dispersion should flow thereacross, and it has been found that if the incoming dispersion laves the electrodes, no oil will contaminate the junction. For example, with the fiber type of junction, the material of the fiber may be preferentially oil-wettable and may tend to break the emulsion, allowing free oil to pass through the junction and contaminate the KCl solution. Laving of the electrode appears to prevent separation of any free oil which might plug the junction or render it ineffective.

The electrochemical potential, developed between leads 71 and 72 of the electrodes 60 and 62, will vary as a function of the hydrogen ion concentration of the oil stream in the pipe 20 and the water of the dispersion passing through the cell 50. This potential may be applied to the input to a pH indicator and amplifier 73, which may be an ordinary pH meter, with a scale 74 calibrated in pH units and with a needle or indicator 75 moving thereadjacent. Any change in the indicated pH can be a signal to the operator to change the amount of reagent, or the output of the pH indicator and amplifier 73 can be employed automatically to adjust the amount of the reagent to bring the pH back to the desired value.

The latter can be accomplished in any one of a number of ways.

For example, the output of the pH indicator and amplifier 73 may be connected to a controller 76, as suggested by the dotted line 77, this connection being usually an electrical one. The controller 76 may be an electrical speed-control means operatively connected to a variable-speed motor 79, as suggested by the dotted line 80, the motor in turn driving the pump 16 through a connection 81. In other instances the controller 76 may be of the pneumatic or hydraulic type in which the connection represented by the dotted line 80 may be a pneumatic or hydraulic connection controlling the driving fluid delivered to the motor 79, which may then be a variable-speed fluid motor such as a turbine. In other instances, as shown in my application supra, the output of the controller 76 may be used to control a valve in the pipe 17 to vary the amount of the reagent delivered to the junction 18. The present invention includes, in one of its aspects, a control means for operatively connecting the electrometric cell 50 to a means for varying the reagent supply, and it should be understood that various control means, not per se a part of the present invention, can be employed.

In most instances it is preferable to use distilled water in the tank 33 although ordinary tap water can be used if its buffering action is not detrimental in the particular control application. The water:oil ratio is not critical, and the minimum ratio is determined by the volume of water required to produce an external aqueous phase. I prefer to use a volume of water larger than the volume of oil. Water:oil ratios considerably in excess of unity are usually employed, ratios of 3:1 to 20:1 or more being entirely practical.

The characteristics of the dispersing agent which I employ are essentially three-fold. In the first place, it must have the property of lowering the interfacial tension between the oil and the water which is used for emulsifying the oil, so that the oil may be very finely dispersed therein during the mixing operation. This promotes establishing an equilibrium between the oil and water phases so that the pH of the final mixture reflects reasonably well the pH of the oil phase.

Secondly, the dispersing agent must promote the formation of an oil-in-water emulsion, as otherwise the glass electrode will not be responsive to the system. Furthermore, it is essential that the dispersing agent impart such characteristics to the water phase that said water phase tends to wet the surface of the glass electrode preferentially to the oil phase. If such preferential wettability is not a property of the water phase, the glass electrode will sooner or later be coated by oil droplets and gradually make it inoperative.

I have found that not all so-called wetting or dispersing agents have the above enumerated characteristics and that certain classes or types are superior to the others in this respect.

In general water-soluble surface-active agents having the glass wetting property described above are suitable for use in my process. The so-called "ionic" agents of this type, whether anionic or cationic can be used with systems in which the pH does not vary over a wide range. If the pH of the system being tested remains above about 5.0, most any of the ionic, water-soluble agents can be used. If the pH of the system extends below a value of about 5, only certain types of the ionic agents are suitable, e. g., materials such as sulphonated castor oil.

However, with systems in which the pH may vary over wider limits, e. g., in testing or controlling systems in which the pH may range between low and very high values (0 to 14) I prefer to use a non-ionic, water-soluble, preferentially glass water-wetting, surface-active agent because the properties of these agents are substantially unaffected by the pH of the environment. Among these water-soluble agents those having an epoxyalkane linkage are preferred, e. g., those having ethylene or propylene oxide linkages. Thus, for example, I can use hydrophobic (i. e. water-insoluble) alcohols, phenols, fatty acids, hydroxylated oils, mercaptans, or fatty acid esters of anhydrosorbitol which have been converted to water-soluble materials by reaction with ethylene or propylene oxide. In general, water-soluble polyoxyethylated compounds represent an excellent class of wetting-dispersing agents for my process.

More particularly, I prefer to use such types of compounds in which the oxyethylation has been controlled to impart certain limits of water solubility to the final product. The most effective compounds are those of an intermediate degree of oxyethylation so that they are readily soluble in water at ordinary temperatures, i. e. about 25° C. but which tend to become somewhat less soluble at higher temperatures (about 50° C. or higher), this decreased solubility being manifested by the formation of a slight haze when solutions of the agent are heated to such temperatures.

The commercially available water-soluble "Tween" products, sold by Atlas Powder Company, are agents of this type, e. g., the products known as Tween 20, 40, 65, and 80. Another commercially available product, "Victawet," sold by Victor Chemical Company, is also suitable, being the polyethyleneglycol hydrophobic alcohol ester of phosphoric acid.

Another example of a very effective agent is oxyethylated tall oil acids containing about two parts of ethylene oxide per weight of tall oil. These tall oil acids may be the acids as usually occurring in tall oil or may be the fatty acids or rosin acids obtainable from such oil.

The ratio of dispersing agent to water or dispersing agent to oil is not critical and will depend upon the particular dispersing agent employed. The amount of the dispersing agent should be sufficient to eliminate contamination of the electrodes over long periods of time. No specific limits can be set forth as to minimum ratios of dispersing agent to oil as this will depend upon the particular dispersing agent and upon the oil being tested. With most efficacious dispersing agents, as with an oxyethylated tall oil fatty acid containing two parts ethylene oxide per weight of tall oil, the ratios of dispersing agent to oil may be as low as one in several hundred. Ratios of 1:2000 to 5:100 are common. With most oils minimum ratios of at least 1:1000 are usually needed, and better results are obtained by using higher ratios in the neighborhood of 1:100. The ratios of dispersing agent to water may be one in many thousand, e. g., 3 to 20 times the above agent:oil ratios. There appears to be no upper limit as concerns the amount of the dispersing agent. Use of amounts larger than those required to keep the electrodes clean appears to offer no special advantages, although large excesses do not detrimentally affect the process or its accuracy. In most instances, however, the use of a dispersing agent has been found necessary if the electrodes are to operate for a prolonged period of time, and the use of a small amount of such dispersing agent, within the confines of the above statement as to volume thereof, is an important part of the present invention.

As a specific example of the invention, the following operation is cited. The oil entering the system has a diluted soap-containing residuum of unduly high ash content, the reagent being a dilute sulphuric acid added in a sufficient amount to desaponify the soaps. Using "Tween 20" as the dispersing agent and condensed steam as the water and using ratios of the dispersing agent to water of about 1:300 and water:oil ratios of 5:1 to 16:1, a very accurate pH control was maintained at a value such that the mixture entering the equipment 21 was easily separable into a residuum of low ash content and an aqueous phase. Using the aforesaid oxyethylated tall oil fatty acids containing two parts of ethylene oxide per weight of tall oil, the invention gave excellent results under the same conditions with water:oil ratios as above and with as little as a 1:2200 ratio of dispersing agent to water.

Keeping in mind that the sample stream withdrawn through the pipe 26 is desirably very small in volume, the amount of water and dispersing agent required in the process is extremely low relative to the total volume of the major stream being tested and which flows along the pipe 20. The pH response or control is extremely sensitive, particularly when working in a region where small changes in the amount of reagent produce marked changes in hydrogen ion concentration. The equipment is simple and trouble-free and offers an excellent and dependable solution to the problem of measuring or determining the pH in oil systems.

The teachings herein will suggest to those skilled in the art various changes and modifications which can be made without departing from the spirit of the present invention.

I claim as my invention:

1. A method of testing an oil sample of an oil substantially completely insoluble in water to determine the hydrogen ion concentration thereof by use of spaced glass and reference electrodes, said method including the steps of: mixing together said oil sample, a volume of water sufficient to produce an oil-in-water dispersion, and a small amount of a non-ionic water-soluble surface-active wetting agent having the property of preferentially wetting the electrode glass with water as compared with wetting the glass with oil, the volume of water and the intensity of mixing being sufficient, in the presence of said agent, to form a water-continuous dispersion comprising an external phase of water with the oil dispersed as small droplets therein; and bridging said electrodes with said dispersion to develop between the electrodes a potential difference related to the hydrogen ion concentration of said oil sample.

2. A method of testing an oil sample of an oil substantially completely insoluble in water to determine the hydrogen ion concentration thereof by use of spaced glass and reference electrodes, said method including the steps of: mixing together said oil sample, a volume of water sufficient to produce an oil-in-water dispersion, and a small amount of a non-ionic water-soluble glass-wetting agent having an epoxyalkane linkage, the volume of water and the intensity of mixing being sufficient, in the presence of said agent, to form a water-continuous dispersion comprising an external phase of water with the oil dispersed as small droplets therein; and bridging said electrodes with said dispersion to develop between the electrodes a potential difference related to the hydrogen ion concentration of said oil sample.

3. A method of testing an oil sample of an oil substantially completely insoluble in water to determine the hydrogen ion concentration thereof by use of spaced glass and reference electrodes, said method including the steps of: mixing together said oil sample, a volume of water sufficient to produce an oil-in-water dispersion, and a small amount of a non-ionic water-soluble glass-wetting agent having an oxide linkage selected from the group consisting of ethylene oxide and propylene oxide linkages, the volume of water and the intensity of mixing being sufficient, in the presence of said agent, to form a water-continuous dispersion comprising an external phase of water with the oil dispersed as small droplets therein; and bridging said electrodes with said dispersion to develop between the electrodes a potential difference related to the hydrogen ion concentration of said oil sample.

4. A method of testing an oil sample of an oil substantially completely insoluble in water to determine the hydrogen ion concentration thereof by use of spaced glass and reference electrodes, said method including the steps of: mixing together said oil sample, a volume of water and a small volume of a dispersing agent comprising a hydrophobic hydroxy compound rendered completely water soluble by reaction with a material selected from the class consisting of ethylene and propylene oxide, the volume of water and the intensity of mixing being sufficient, in the presence of said compound, to form a water-continuous dispersion comprising an external phase of water with the oil dispersed therein in the form of small droplets; and bridging said electrodes with said dispersion to develop between the electrodes a potential difference related to the hydrogen ion concentration of said oil sample.

5. A method as defined in claim 4 in which said dispersing agent is readily soluble in water at temperatures of about 25° C. but less soluble at a higher temperature of at least 50° C. to form a slight haze when an aqueous solution of the agent is heated to such higher temperature.

6. A method as defined in claim 4 in which said dispersing agent is an oxyethylated tall oil acid containing about two parts ethylene oxide per weight of tall oil.

7. A method as defined in claim 6 in which said tall oil acid is a fatty acid obtained from tall oil.

8. A method as defined in claim 6 in which said tall oil acid is a rosin obtained from tall oil.

9. A method for the continuous electrometric control of the amount of a reagent mixed continuously with a stream of oil which is substantially completely insoluble in water to produce a stream containing reaction products, which method includes the steps of: continuously sampling said oil stream containing said reaction products to produce a small oil sample stream; continuously mixing with said sample stream a proportioned stream of water containing a non-ionic water-soluble glass-wetting surface-active dispersing agent having an epoxyalkane linkage, said agent being of the type promoting and stabilizing oil-in-water type dispersions and having a strong tendency to water wet glass surfaces, the volume of water and the intensity of this mixing and the amount of said dispersing agent being sufficient to form a stream of a water-continuous dispersion comprising an external phase of water with the oil sample dispersed therein in the form of small oil droplets; developing an electrometric potential varying with the hydrogen ion concentration of said dispersion before any substantial portion of said dispersed oil droplets have separated from the dispersion; and varying the amount of said reagent added to said oil stream in a manner to maintain said electrometric potential substantially constant.

References Cited in the file of this patent

UNITED STATES PATENTS

| 1,970,578 | Schoeller et al. | Aug. 21, 1934 |
| 2,046,583 | Rummel | July 7, 1936 |
| 2,047,985 | Weir | July 21, 1936 |
| 2,108,293 | Perley | Feb. 15, 1938 |
| 2,345,465 | Miles et al. | Mar. 28, 1944 |
| 2,488,812 | Galstaun et al. | Nov. 22, 1949 |
| 2,513,562 | Holuba | July 4, 1950 |
| 2,607,718 | Suthard | Aug. 19, 1952 |

OTHER REFERENCES

"Journal of International Society of Leather Trades Chemists," vol. 21 (1937), pp. 261 thru 274; article by Parsy (abstracted in C. A., vol. 31 (1937), pp. 5475 and 5476).